(12) United States Patent
Fleming et al.

(10) Patent No.: US 6,562,256 B1
(45) Date of Patent: May 13, 2003

(54) SELF-DISPERSING PARTICULATE COMPOSITION AND METHODS OF USE

(75) Inventors: Wayne Anthony Fleming, Dallas, TX (US); Robert Martin Holdar, Irving, TX (US); Robert Clarence Pearce, III, Arlington, TX (US)

(73) Assignee: NCH Corporation, Irving, TX (US)

( * ) Notice: Subject to any disclaimer, the term of this patent is extended or adjusted under 35 U.S.C. 154(b) by 0 days.

(21) Appl. No.: 10/140,414

(22) Filed: May 6, 2002

(51) Int. Cl.$^7$ .................................................. C09K 3/18
(52) U.S. Cl. ........................................... 252/70; 106/13
(58) Field of Search ............................... 252/70; 106/13

(56) References Cited

U.S. PATENT DOCUMENTS

| | | | |
|---|---|---|---|
| 3,012,893 A | 12/1961 | Kremzner et al. | ............. 99/134 |
| 3,985,909 A | 10/1976 | Kirkpatrick | .................. 426/572 |
| 3,985,910 A | 10/1976 | Kirkpatrick | .................. 426/572 |
| 4,001,457 A | 1/1977 | Hegadorn | .................... 426/572 |
| 4,262,029 A | 4/1981 | Kleiner et al. | ............... 426/512 |
| 4,273,793 A | 6/1981 | Fariel et al. | ................. 426/572 |
| 4,289,794 A | 9/1981 | Kleiner et al. | ............... 426/660 |
| 4,303,432 A | 12/1981 | Torobin | ........................ 65/21.4 |
| 4,692,259 A * | 9/1987 | Roman | ......................... 252/70 |
| 5,176,210 A | 1/1993 | Gammon | ....................... 175/18 |
| 6,047,926 A * | 4/2000 | Stanko et al. | ............ 244/134 R |
| 6,270,020 B1 * | 8/2001 | Thompson et al. | ........... 239/67 |

FOREIGN PATENT DOCUMENTS

| | | | |
|---|---|---|---|
| JP | 55-104379 | * | 8/1980 |
| JP | 4-198294 | * | 7/1992 |
| WO | WO 00/17484 | * | 3/2000 |

OTHER PUBLICATIONS

Parr Reactor advertisement, Today's Chemist at Work, Jul./Aug. 1997, p. 36.

* cited by examiner

*Primary Examiner*—Anthony J. Green
(74) *Attorney, Agent, or Firm*—Locke Liddell & Sapp LLP; Monty L. Ross

(57) ABSTRACT

A self-dispersing particulate composition, in the form of pellets, prills, flakes or granules, containing particles with a first functional component that is a glassy solid with small, dispersed pockets of pressurized gas and, in the same or different particles, a second functional component that is a special-use material having at least one additional utility. Special use materials include, for example, a deicer, a fertilizer, a drain cleaner, an insecticide, a carpet cleaner, and a powdered laundry detergent. Dissolution of the glassy material liberates pressurized gas, causing repositioning of the special-use material.

28 Claims, No Drawings

SELF-DISPERSING PARTICULATE COMPOSITION AND METHODS OF USE

BACKGROUND OF THE INVENTION

1. Field of the Invention

This invention relates to self-dispersing particulate materials, and more particularly, to self-dispersing particulate materials containing pressurized gas that is trapped in discrete cavities or pockets inside a continuous matrix. The matrix material is solid prior to use but is partially dissolved during use to spontaneously liberate pockets of the entrapped, pressurized gas. When liberated during use, the gas exerts sufficient force to propel or rapidly reposition the particle from which the gas is expelled. This repositioning causes random scattering and dispersion of the particulate material. Useful applications for the composition include, for example, deicers, drain cleaners, fertilizers, insecticides, floor cleaners, and the like.

2. Description of Related Art

The use of particulate deicers such as mineral salts for melting ice and snow is well known. Such particulate materials are typically scattered by hand or with a broadcast-type spreader over an icy surface. Unfortunately, the coverage achieved with such distribution methods is often irregular, especially when the materials are broadcast manually. Ice contacted by the deicer particles typically melts in a crater around the particle, forming a small pool of water that can insulate the particle from further contact with the surrounding ice, thereby slowing melting. Although liquid deicer compositions are also available and provide good coverage, they are most often applied using mechanical sprayers and often exhibit the associated disadvantage of producing a surface that is more slippery, and therefore more hazardous to pedestrian or vehicular traffic, than an icy surface having a particulate mineral composition scattered over it. A dry particulate deicer composition is therefore needed that includes at least one component capable of melting ice and at least one other component capable of continually dispersing and redistributing the melting component across an icy surface to achieve improved particle dispersion. Other systems for thermochemical ice melting are disclosed in U.S. Pat. No. 5,176,210. Prior art patents such as, for example, U.S. Pat. Nos. 3,012,893, 3,985,909 and 3,985,910, disclose the manufacture of flavored and colored, gas-containing, candy particles that "pop" or "explode" whenever entrapped pockets of compressed carbon dioxide gas are liberated as the sugary material dissolves upon contact with saliva or other liquids. Generally speaking, such candies are made by injecting gas into heated sugar syrup while under pressure, thereafter cooling to solidify the syrup, releasing the pressure and fracturing the glassy candy into particles. Such novelty items do not, however, serve any other beneficial purpose or perform any other function or utility that is worthwhile in connection with other consumer, commercial, governmental, institutional, industrial, recreational or environmental needs or objectives.

Other prior art relating to gasified candies and methods and apparatus for making them include, for example, U.S. Pat. Nos. 4,001,457; 4,262,029; 4,273,793; and 4,289,794.

SUMMARY OF THE INVENTION

The self-dispersing particulate composition of the invention is desirably a product in the form of pellets, prills, flakes or granules that comprises particles containing a first functional component capable of releasing pressurized gas in combination with particles containing a second functional component, or special-use component, having at least one additional utility. Such additional utilities can vary widely, depending upon the chemical makeup of the special-use component, and can include, for example, the capability for functioning as a deicer, a fertilizer, a drain cleaner, an insecticide, or the like. According to one embodiment of the invention, the subject composition is a mixture of dispersing particles and special-use particles. According to another, particularly preferred, embodiment of the invention, the subject composition contains only a single type of particle, which embodies both the self-dispersing and special-use components.

The advantages of using the self-dispersing particulate compositions of the invention in comparison to other conventional, commercially available products can vary according to the particular use that is intended. Where the special-use component is a deicer, for example, the dispersing component causes the special-use component to be spread to other nearby areas where no melting has yet occurred. Besides deicers, other commonly used products consisting of particulate materials can also be made more effective by providing an innate or collateral ability for the particles to randomly reposition themselves during use. Such products can include, for example, particulate fertilizers, insecticides, and the like. In other applications, such as where the special-use component is a drain cleaner, the pressurized gas released by particles containing the dispersing component at the point of use, such as inside a P-trap, can assist in dislodging matter clogging the drain as it is being dissolved or otherwise acted upon by the special-use component.

According to one preferred embodiment of the invention, a self-dispersing particulate product intended for use as a deicer, the composition comprises particles having a solid phase containing an alkaline earth metal salt such as calcium chloride or magnesium chloride dissolved or dispersed in a glassy, sugary material, and finely divided bubbles of pressurized gas disposed within the fused, glassy material. During use of the subject composition, the particles are initially scattered across an icy surface to be treated. As melting occurs due to hydration of the salt, the resultant water also causes the glassy, sugary material to begin dissolving away, eventually exposing pockets of pressurized gas disposed inside the particles. As the glassy part of the particles begins dissolving, pressurized gas escapes forcibly from each successively exposed cavity in which it was previously entrapped during manufacture. This successive, forcible liberation of gas from cavities inside the particles, as the wall around each cavity dissolves, repeatedly causes the particles to be propelled to other positions, sometimes inches or even feet away. For illustrative purposes, the resultant effect is similar to the way popcorn kernels are propelled when moisture inside them is vaporized during cooking, causing the kernels to "pop" around to different positions. The subject composition is useful for melting ice from surfaces such as sidewalks, steps, ramps, roadways, runways, bridges and the like. Alternatively, the dispersing and special-use components can be disposed in different particles, which are then intermixed to form the subject composition.

According to another embodiment of the invention, the dispersing component of the subject composition preferably contains sufficient finely divided, dispersed, trapped, compressed gas that, when liberated upon contact with moisture, the gas will exert a force adequate to move the particle from which the propellant is released to a different position on an underlying surface. Although not preferred, dispersing components can also be made that contain reactants capable of rapidly generating a quantity of pressurized gaseous propellant that is sufficient to relocate or reposition a particle when contacted by moisture or another substance present in the use environment. Preferably, the force generated through release of the propellant will be sufficient to relocate the propelled particle a distance that is at least several times the maximum particle dimension. When the dispersing component and the special-use component of the invention are contained in separate particles, the particles containing the dispersant will desirably move with sufficient momentum when activated to collide with particles containing the special-use component and cause repositioning of those particles as well. In the latter case, the use of from at least about 5 to about 50 percent or more, and most preferably from about 10 to about 25 percent, dispersing particles is believed to be desirable for promoting a suitable level of physical interaction with particles containing the special-use component. It will be appreciated, however, that even more dispersing particles can be needed, depending upon the degree to which particles are scattered during application.

DESCRIPTION OF THE PREFERRED EMBODIMENTS

A self-dispersing particulate composition is disclosed herein that comprises at least first and second functional components, which first and second components can be disposed in the same or different particles. The particles themselves can take the form of pellets, prills, flakes or granules, and where the first and second components are disposed in different particles, the particle form can be different for the different particles. Thus, for example, the first functional component can be present in particles having the form of granules while the second functional component is present in particles having the form of flakes.

The first functional component of the compositions of the invention is preferably a self-dispersing particle containing either a pressurized gas or a material that, when contacted with a reactive liquid, produces a pressurized gas. As used herein, the term "self-dispersing" refers to the tendency of a particle to move and reposition itself whenever contacted and acted upon by another substance, such as moisture, so as to expose cavities containing pressurized gas and thereby liberate the gas. As used herein, the term "pressurized gas" means a gas that is liberated at a pressure or rate that is sufficiently high to produce movement and repositioning of the particle from which the gas is liberated. According to a particularly preferred embodiment of the invention, small pockets of gas at a pressure substantially greater than atmospheric, most preferably on the order of several hundred pounds per square inch, are dispersed and confined inside the particle during manufacture. The particles in which the pressurized gas is entrapped are preferably made of a glassy material such as, for example, sugar-based compositions comprising cane sugar, corn syrup, sucrose, lactose, and mixtures thereof. A particularly preferred gas for use in the self-dispersing particles of the invention is carbon dioxide. According to conventional methods known to those of skill in the art, such particles can be made by injecting the pressurized gas into the bottom portion of a reactor containing a heated, viscous sugar solution undergoing rapid agitation so that the gas bubbles become finely divided and distributed throughout the solution. The solution is thereafter cooled under pressure to solidify and fuse the sugar into a solid containing entrapped bubbles of compressed gas dispersed throughout a continuous matrix of glassy, solidified sugar. The resultant mass can be fragmented into particulate form by releasing the pressure on the reactor, or by any other suitable means or combination of additional processing steps, which can include pressure reduction, hammering, screening, or the like. The fragmented particles are desirably maintained in a dry or low humidity environment at temperatures lower than about 38° C. until the time of use to prevent clumping or melting that could cause the premature release of pressurized gas from the particles.

Sugar-based compositions are particularly preferred for use as the glassy material where water is present in the use environment because contact with water will cause the glassy material to begin dissolving and thereby uncover bubbles or pockets of pressurized gas. Similarly, where non-aqueous solvents are present in the intended use environment, a different glassy material that is soluble in such other solvents can also be employed within the scope of the invention. Although carbon dioxide is a preferred gaseous component for use in the self-propelling particles of the invention, it should be appreciated that other gases such as air and nitrogen can be similarly used, provided they are safe for the intended application.

The second functional component of the compositions of the invention is preferably a special-use material that can be disposed in the same particles as the pressurized gas component or can be disposed in other particles that are intermixed with the self-dispersing particles to produce the subject compositions. As used herein, the term "special-use" means any utility or application beyond those achieved through use of the first component alone. Special-use materials suitable for inclusion as the second functional component, also referred to herein as the special-use component of the invention, can include compositions that are themselves useful as, for example, deicers, fertilizers, insecticides, drain cleaners, carpet cleaners, powdered laundry detergents and the like. In compositions of the invention wherein the first and second functional components are present in the same particle, the special-use component is preferably a compound that is soluble or readily dispersible in, and substantially non-reactive with, the glassy material used in making the first functional component. In compositions of the invention wherein the first and second functional components are disposed in separate particles that are intermixed, and wherein the glassy material used in the first component is water soluble, the special-use component is preferably a compound that is non-reactive with the glassy material used in making the first functional component. Because moisture can cause sugary solids to stick, clump and partially dissolve, such compositions of the invention are desirably packaged in moisture resistant bags or containers, and can also contain a desiccant where needed.

One particularly preferred composition of the invention is useful for deicing surfaces such as sidewalks, driveways, steps, porches, and the like. Particles containing the first functional component of the invention are preferably made by combining a sugary material with a minor amount of liquid, which may be present as a hydrate, but is typically water in an amount constituting about one weight percent of the total, that is effective for forming a solution. The excess water may be removed under vacuum. The resultant solution is heated to a temperature of about 100 to about 150° C. inside a closed, stirred reactor; injecting pressurized carbon dioxide into the stirred solution to effect the dispersion of small bubbles of gas throughout the solution, until the solution is substantially saturated with the gas and the pressure inside the reactor is about 600 psi; cooling the reactor to a temperature ranging between about 22 and about 4° C. while still under pressure to solidify the solution; and thereafter releasing the pressure inside the reactor, causing the gasified, glassy, solid material inside the reactor to fracture into particles. During cooling, the pressure inside the reactor may drop to about 400 psi. When the reactor pressure is released and the solid mass fractures, some portion of the previously entrapped gas is released, although nearly all of the particles thus produced will still contain pockets of pressurized gas entrapped within voids or cavities inside the glassy solid. If the solution is gasified at pressures substantially higher than about 600 psi, the glassy solid may fracture too much when pressure is released; whereas, if gasification is conducted at pressures substantially lower than about 600 psi, insufficient fracturing can occur upon depressurization. Additional screening and fragmentation by other conventional mechanical means can be used if needed to obtain a desired particle size distribution. Preferred particle sizes for the ice melting component of the invention range from about 0.1 mm to about 8 mm, and most preferably, from about 1 mm to about 4 mm.

If the temperature of the solution inside the reactor is permitted to climb higher than about 150° C., undesirable caramelization or carbonization of the sugary material can occur. The pressurized gas entrapped in the glassy solid will typically cause the solid to fracture into particles of usable size when pressure inside the reactor is reduced. At the same time, the solid material will undergo a volume expansion due to the lower bulk density of the particulate material. If desired, the pressurized, gasified sugary solution can be pumped or drained from the reactor into other vessels and maintained under pressure during cooling to permit reuse of the reactor prior to completion of the process.

Similarly sized particles containing the second functional component are thereafter preferably intermixed with the self-dispersing particles prior to packaging. According to one preferred embodiment of the invention, where the first and second functional components are embodied in different particles of the composition, the ratio of particles containing the first functional component to particles containing the second functional component will desirably range from about 1:20 to about 1:1, with particle ratios ranging from about 1:10 to about 1:3 being most preferred. It is emphasized, however, that a particular numerical correspondence between special-use particles and self-dispersing particles is not required so long as the size and number of self-dispersing particles are sufficient to promote contact with and achieve the desired random redistribution of particles containing a special-use component. Preferred materials for use as the second functional component of the deicer composition described above include calcium chloride, magnesium chloride, calcium magnesium acetate, sodium acetate, urea, and mixtures thereof, whether in pellet, prill, flake or granulated form. The use of calcium chloride and/or magnesium chloride is particularly preferred, although magnesium chloride is significantly more expensive than calcium chloride. Although the use of anhydrous salts will help keep water-soluble glassy materials from becoming moist and sticking, the use of selected exothermic hydrated salts is also believed to accelerate melting. In some cases, the addition of a surfactant is also believed to promote effectiveness of the compositions. If desired, the particles containing the second functional component can also comprise a filler material or extender, or another special-purpose additive.

According to another preferred embodiment of the invention, the second functional component is added directly to the solution of glassy material prior to gasification. Although either anyhydrous or hydrated salts may be used as the second functional component as shown in the prior embodiment, the use of hydrated salts may provide excess water which may be removed by vacuum prior to heating in the reactor. In this embodiment of the invention, unlike the embodiment wherein the second functional component is in a separate particle, it is important that the deicer component be either soluble or easily dispersible in the solution of glassy material. Typically, the second functional component is non-reactive either with the glassy material or with the pressurized gas that is injected into the solution of glassy material during manufacture. Where the dispersing component is a sugary material and the special-use component is a salt such as calcium chloride, the salt will typically be readily dispersible throughout the sugar solution. Other special-use components such as urea or sodium acetate, on the other hand, are typically soluble in the sugar solution. In either case, the combined sugary liquid and special-use component are referred to herein as a "solution."

In the preferred single-particle deicer composition of the invention, the amount of deicer component that is added to the sugary solution will desirably constitute from about 15 to about 35 weight percent, and most preferably from about 20 to about 30 weight percent, of the combined solution. Examples of deicer compositions made in accordance with the invention are set forth below.

EXAMPLE 1

A sugary solution comprising about 79 weight percent cane sugar, about 20 weight percent urea (0.6 hydrate) and about 1 weight percent water is prepared in a Parr reactor having a paddle-type stirrer and substantial headspace over the solution. The temperature is gradually increased while stirring at 1250 rpm or greater, and is controlled within a range of from about 100 to about 135° C. while injecting carbon dioxide into the solution through a tube discharging approximately ¼ inch from the bottom until the solution is substantially saturated with finely divided bubbles of dispersed gas and the pressure inside the reactor is about 600 psi. Stirring is then stopped and the reactor is cooled to a temperature ranging between about 22 and about 4° C., during which time the reactor pressure falls to about 400 psi and a fused, glassy solid is formed. After cooling, the reactor is opened and the solid mass fractures, producing a larger bulk volume of small, irregularly shaped particles that are easily removed from the reactor. The resultant particles are scattered manually over an ice-covered driveway. As melting commences, water is observed forming around the particles, followed by "popping" or random repositioning and relocation of the particles over the surface of the ice, with continued melting in each location where the relocated particles come to rest.

EXAMPLE 2

Particles are prepared as for Example 1 except that the solution inside the reactor comprises about 79 weight percent sugar, about 10 weight percent urea (0.6 hydrate), about 10 weight percent calcium chloride, and about 1 weight percent water. The resultant particles are again scattered manually over an ice-covered driveway. As melting commences, water is observed forming around the particles, followed by "popping" or random repositioning and relocation of the particles over the surface of the ice, with continued melting in each location where the relocated particles come to rest.

EXAMPLE 3

Particles are prepared as for Example 1 except that the solution inside the reactor comprises sugar and calcium chloride in a weight ratio of about 70% to about 30%, together with a minor amount of water. The resultant particles are again scattered manually over an ice-covered driveway. As melting commences, water is observed forming around the particles, followed by "popping" or random repositioning and relocation of the particles over the surface of the ice, with continued melting in each location where the relocated particles come to rest.

EXAMPLE 4

Particles are prepared as for Example 1 except that the solution inside the reactor comprises about 70 weight percent sugar and about 30 weight percent sodium acetate trihydrate. Water is provided by the sodium acetate trihydrate, which contains 39.7% water by weight. The excess water is removed by vacuum prior to heating. The resultant particles are again scattered manually over an ice-covered driveway. As melting commences, water is observed forming around the particles, followed by "popping" or random repositioning and relocation of the particles over the surface of the ice, with continued melting in each location where the relocated particles come to rest. The use of sodium acetate trihydrate forms a lower viscosity melt in which gasification can be performed at a lower temperature than is required, for example, where calcium or magnesium chloride is the special-use component.

EXAMPLE 5

A sugary solution comprising about 90 weight percent cane sugar and about 10 weight percent corn syrup is formed in a stirred Parr reactor as described above. The reactor is closed and the temperature is gradually increased while stirring, and is controlled within a range of from about 100 to about 135° C. while injecting carbon dioxide into the solution until the solution is substantially saturated with the gas and the pressure inside the reactor is about 600 psi. Stirring is then stopped and the reactor is cooled to a temperature between about 22 and about 4° C., during which time the reactor pressure falls to about 400 psi and a fused, glassy solid is formed. After cooling, the reactor is opened and the solid mass fractures, producing a larger bulk volume of small, irregularly shaped particles that are easily removed from the reactor. The resultant particles are mixed with similarly sized particles of substantially anhydrous calcium chloride in a ratio of about 1:3, and the resultant mixture is scattered manually over an ice-covered driveway. As melting commences, water is observed forming around the particles of calcium chloride. As melt water begins to accumulate on the surface of the ice and contacts particles of the gasified, sugary solid, "popping" or random repositioning and relocation of the sugary particles is observed. This "popping" of the sugary particles is observed to cause collisions with calcium chloride particles scattered nearby, resulting in repositioning and relocation of the calcium chloride particles over the surface of the ice, with continued melting in the location where each such relocated deicer particle comes to rest.

The deicer compositions disclosed herein are believed to provide several valuable advantages over conventional, commercially available broadcast deicer products. One advantage relates to the "self-spreading" feature as already described. Another relates to the faster rate at which the special-use component is dissolved during use, especially when combined into a single, sugary particle containing the pressurized gas. Still another advantage relates to the tendency of the self-dispersing component to "stir" the thermally stratified melt water that forms in craters around the deicer component, thereby circulating warmer water at the top of the melt water pool to the underlying ice and further accelerating melting. Finally, in addition to promoting melting by scarifying and pitting the underlying icy surface, the subject deicer compositions simultaneously improve traction for a user, thereby reducing slippage and resultant injury during ice removal.

While the preferred compositions of the invention and a preferred method for making them are disclosed herein, it should be understood that other components and methods satisfactory for use in making the gasified, fused, glassy material that is the first functional component of the invention are more completely described, for example, in U.S. Pat. Nos. 3,012,893; 3,985,909; and 3,985,910, the specifications of which are incorporated by reference herein. These references disclose, for example, that candy glasses containing from about 2.5 to about 15 ml, and preferably from about 4 to about 6 ml of carbon dioxide per gram, produce satisfactory results; that stirring speeds over 1200 rpm are preferred in order to incorporate greater amounts of gas into the product; and that a relatively large headspace should be maintained above the level of the melt inside the vessel in order to achieve the degree of turbulence needed to divide the gas bubbles into minute dimensions. Mixing times ranging from about 2 to about 6 minutes are typically needed in order to obtain the desired saturation and dispersion of gas, depending upon the composition, temperature and viscosity of the solution. Although the compositions of the invention are described above in relation to the preferred embodiment of a deicer, it is believed that compositions having other beneficial uses can be made in substantially the same manner using the inventive concepts disclosed herein, but with different special-use components. If intended for use in an environment where the product is likely to encounter water before reaching the optimal use site, or where a time-delay effect is desired, some or all of the particles can be coated or encased in a gelatin shell that will delay liberation of the pressurized gas even after the product is contacted by water. Variable delay intervals are likewise achievable through the use of different coating materials and/or thicknesses.

One beneficial product within the broader scope of the invention is a fertilizer product made by combining a dispersing component the same as, or similar to, that described above in combination with a special-use component that comprises salts of conventional fertilizer components such as nitrogen, potassium and phosphorus. The use of a sugary dispersant can also promote the growth of useful microorganisms within the soil, thereby enhancing the effectiveness of the fertilizer.

Another beneficial product made within the broad scope of the invention is a two-component drain cleaner. In this application of the disclosed invention, the special-use component can be any commercially available drain cleaning substance that is compatible with the self-dispersing component. If needed, and especially where the special-use component is contained in separate particles, gelatin coatings can be used to delay activation of the self-dispersing component until the special-use component has been given time to act, for example, inside the P-trap of a standard drain. Once the special-use component has softened or chemically degraded the clogging matter inside the drain, activation of the self-dispersing component to liberate pressurized gas at the use site can assist in dislodging and displacing the clogging matter.

Another beneficial product made within the broad scope of the invention is a fire ant insecticide product. The effectiveness of a conventional insecticide composition known to be useful in treating fire ant mounds can be further enhanced by combining it with a self-dispersing component according to the present invention. The liberation of carbon dioxide inside the mound is believed to cause ants to lose consciousness, and some additional subsurface scattering of the special-use component is also achieved.

Another beneficial product made within the broad scope of the invention is a carpet shampoo that uses the mechanical energy of the gas liberated from the self-dispersing component to penetrate the carpet pile, dislodge grime and otherwise promote cleaning.

Another beneficial product made within the broad scope of the invention is a powdered laundry product that exhibits a release of energy in the form of pressurized gas even when a washing machine is filling with water prior to commencing agitation. The powdered laundry product of the invention preferably comprises an admixture of a dispersing component as described above in combination with particles of a conventional powdered laundry detergent.

While the first functional component of the invention preferably comprises either a compressed gas trapped inside a water-soluble, glassy solid, other embodiments can utilize reactants that will explosively generate a gas in situ when contacted by water or another material that is present in the use environment. With either propellant embodiment of the invention, sufficient gas should be forcibly released or expelled from the particle to cause rapid acceleration of the particle away from its initial position on the underlying surface, most preferably to a position that is farther away from the initial position than several times the maximum external dimension of the particle. This movement produces collisions with other particles containing the ice melting component, causing them to be redistributed.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is claimed is:

1. A deicer composition comprising a plurality of particles, at least some of the particles comprising an ice-melting component that, when contacted with ice, reacts chemically with the ice to produce melt water, and at least some of the particles further comprising a self-dispersing component containing a glassy solid with dispersed pockets of confined, pressurized gas that, when partially dissolved upon contact with melt water, liberates pressurized gas at a rate sufficient to reposition the particle from which the gas was liberated.

2. The composition of claim 1 wherein the ice-melting component comprises a material selected from the group consisting of calcium chloride, magnesium chloride, calcium magnesium acetate, sodium acetate, urea and mixtures thereof.

3. The composition of claim 1 wherein the gas is selected from the group consisting of carbon dioxide, air and nitrogen.

4. The composition of claim 1 wherein the glassy solid is a material selected from the group consisting of sugar, corn syrup and mixtures thereof.

5. The composition of claim 1 wherein each particle contains both an ice-melting component and a self-dispersing component.

6. The composition of claim 1 wherein the ice-melting component and the self-dispersing component are contained in different particles.

7. The composition of claim 1 wherein the particles range in weight from about 0.5 g to about 0.001 g.

8. The composition of claim 1 wherein the particle size ranges in size from about 0.1 mm to about 8 mm.

9. The composition of claim 1 wherein the gas confined within the self-dispersing component is at a pressure of about 400 psi.

10. The composition of claim 5 wherein the amount of ice-melting component ranges from about 15 to about 35 weight percent of the composition.

11. The composition of claim 6 wherein the ratio of particles containing the self-dispersing component to particles containing the ice-melting component ranges from about 1:20 to about 1:1.

12. A particulate composition comprising first and second functional components, the first component comprising a glassy solid containing dispersed pockets of pressurized gas and the second component comprising a special-use material having utility as a deicer.

13. The composition of claim 12 wherein the special-use material is selected from the group consisting of hydrated and anhydrous salts, including calcium chloride, magnesium chloride, urea, sodium acetate, calcium magnesium acetate, and mixtures thereof.

14. The composition of claim 12 wherein the first and second functional components are contained in the same particles.

15. The composition of claim 12 wherein the first and second functional components are contained in different particles.

16. The composition of claim 14 wherein the second functional component comprises from about 15 to about 35 weight percent of the particles.

17. The composition of claim 16 wherein the second functional component comprises from about 20 to about 30 weight percent of the particles.

18. The composition of claim 15 having a ratio of particles containing the first functional component to particles containing the second functional component that ranges from about 1:20 to about 1:1.

19. The composition of claim 18 wherein the ratio of particles containing the first functional component to particles containing the second functional component that ranges from about 1:10 to about 1:3.

20. The composition of claim 14 wherein the glassy solid comprises about 80 weight percent sugar and about 20 weight percent urea.

21. The composition of claim 14 wherein the glassy solid comprises about 80 weight percent sugar, about 10 weight percent calcium chloride, and about 10 weight percent urea.

22. The composition of claim 14 wherein the glassy solid comprises from about 70 to about 95 weight percent sugar and from about 5 to about 30 weight percent sodium acetate trihydrate.

23. The composition of claim 12 wherein the particles are in a form selected from at least one pellets, prills, flakes and granules.

24. The composition of claim 12 wherein the glassy solid is selected from the group consisting of sugar, corn syrup and mixtures thereof.

25. The composition of claim 24 wherein the glassy solid is sugar.

26. The composition of claim 12 wherein the gas is selected from the group consisting of carbon dioxide, air and nitrogen.

27. The composition of claim 26 wherein the gas is carbon dioxide.

28. The composition of claim 14 wherein the glassy solid comprises about 70 weight percent sugar and about 30 weight percent calcium chloride.

* * * * *